United States Patent
Nielsen

(10) Patent No.: US 12,270,377 B2
(45) Date of Patent: Apr. 8, 2025

(54) MULTI-ROTOR WIND TURBINE YAW CONTROL

(71) Applicant: VESTAS WIND SYSTEMS A/S, Aarhus (DK)

(72) Inventor: Johnny Nielsen, Svenstrup (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 60 days.

(21) Appl. No.: 18/250,354

(22) PCT Filed: Oct. 14, 2021

(86) PCT No.: PCT/DK2021/050308
§ 371 (c)(1),
(2) Date: Apr. 24, 2023

(87) PCT Pub. No.: WO2022/083835
PCT Pub. Date: Apr. 28, 2022

(65) Prior Publication Data
US 2023/0407839 A1  Dec. 21, 2023

(30) Foreign Application Priority Data
Oct. 23, 2020  (DK) .......................... PA 2020 70700

(51) Int. Cl.
*F03D 7/02*  (2006.01)
*F03D 7/04*  (2006.01)
*F03D 9/25*  (2016.01)

(52) U.S. Cl.
CPC .......... *F03D 7/0204* (2013.01); *F03D 7/046* (2013.01); *F03D 9/25* (2016.05); *F05B 2240/37* (2020.08);
(Continued)

(58) Field of Classification Search
CPC .......... F03D 7/0204; F03D 7/046; F03D 9/25; F05B 2240/37; F05B 2270/321;
(Continued)

(56) References Cited

U.S. PATENT DOCUMENTS

| 8,476,780 B2 * | 7/2013 | Hashimoto | ............. F03D 7/042 290/43 |
| 9,041,240 B2 * | 5/2015 | Ishimine | ................... F03D 9/25 290/55 |

(Continued)

FOREIGN PATENT DOCUMENTS

| EP | 3214305 A1 | 9/2017 |
| EP | 3473851 A1 | 4/2019 |

(Continued)

OTHER PUBLICATIONS

Danish Patent and Trademark Office, 1st Technical Examination including The Search Report and Search Opinion for Application PA 2020 70700 dated Mar. 29, 2021.
(Continued)

*Primary Examiner* — Tulsidas C Patel
*Assistant Examiner* — Thomas K Quigley
(74) *Attorney, Agent, or Firm* — Patterson + Sheridan, LLP

(57) ABSTRACT

There is provided methods and systems for controlling a multi-rotor wind turbine generator having at least two rotor nacelle assemblies mounted to a support arrangement by a common yaw control system and each having a wind direction sensor mounted thereto configured to measure a wind direction relative to forward direction of its rotor nacelle assembly. The methods comprise the steps of measuring, for each rotor nacelle assembly, wind power parameter data over a plurality of relative wind directions, determining, based on the measured data, an optimum relative
(Continued)

wind direction, either based on the average of two directions at which the parameter is maximum or on a combined data set, and controlling the yaw system accordingly.

17 Claims, 8 Drawing Sheets

(52) U.S. Cl.
CPC ... *F05B 2270/321* (2013.01); *F05B 2270/329* (2013.01); *F05B 2270/335* (2013.01); *F05B 2270/504* (2013.01)

(58) Field of Classification Search
CPC .......... F05B 2270/329; F05B 2270/335; F05B 2270/504
See application file for complete search history.

(56) References Cited

U.S. PATENT DOCUMENTS

| | | | | |
|---|---|---|---|---|
| 9,222,466 | B2 * | 12/2015 | Tarnowski | F03D 9/257 |
| 9,856,860 | B2 * | 1/2018 | Vangen | G01S 13/505 |
| 10,273,939 | B2 * | 4/2019 | Baun | F03D 7/0296 |
| 10,570,880 | B2 * | 2/2020 | Baun | F03D 1/02 |
| 10,648,454 | B2 * | 5/2020 | Miranda | G05B 19/042 |
| 10,690,116 | B2 * | 6/2020 | Grunnet | F03D 1/02 |
| 10,711,764 | B2 * | 7/2020 | Baun | F03D 7/0268 |
| 10,763,670 | B2 * | 9/2020 | Trankjær | H02J 3/381 |
| 10,968,893 | B2 * | 4/2021 | Jensen | F03D 13/20 |
| 10,982,650 | B2 * | 4/2021 | Grunnet | F03D 7/0224 |
| 11,174,838 | B2 * | 11/2021 | Nielsen | G01P 13/02 |
| 11,199,178 | B2 * | 12/2021 | Jensen | F03D 13/20 |
| 11,300,100 | B2 * | 4/2022 | Sørensen | F03D 7/0224 |
| 11,384,730 | B2 * | 7/2022 | Dalsgaard | F03D 9/25 |
| 11,913,431 | B2 * | 2/2024 | Steele | F03D 7/0296 |
| 2011/0084485 | A1 * | 4/2011 | Miranda | H02P 9/04 290/44 |
| 2012/0051939 | A1 * | 3/2012 | Marvin | F03D 80/85 416/244 R |
| 2014/0077505 | A1 * | 3/2014 | Ishimine | F03D 9/25 290/55 |
| 2015/0247486 | A1 * | 9/2015 | Wepfer | F03D 1/02 416/9 |
| 2018/0017042 | A1 * | 1/2018 | Baun | H02K 7/1838 |
| 2018/0023543 | A1 * | 1/2018 | Kudsk | F03D 15/10 416/9 |
| 2018/0180022 | A1 * | 6/2018 | Baun | F03D 7/0268 |
| 2018/0283355 | A1 * | 10/2018 | Miranda | F03D 1/02 |
| 2018/0347544 | A1 * | 12/2018 | Grunnet | F03D 7/0296 |
| 2018/0355847 | A1 * | 12/2018 | Baun | F03D 7/0296 |
| 2019/0093630 | A1 * | 3/2019 | Grunnet | F03D 1/02 |
| 2019/0145380 | A1 * | 5/2019 | Jensen | F03D 1/02 416/244 R |
| 2019/0170119 | A1 * | 6/2019 | Nielsen | G05B 19/042 |
| 2020/0032770 | A1 * | 1/2020 | Nielsen | G01P 13/02 |
| 2020/0318613 | A1 * | 10/2020 | Sørensen | F03D 7/0264 |
| 2020/0332765 | A1 * | 10/2020 | Dalsgaard | F03D 7/028 |
| 2020/0408195 | A1 * | 12/2020 | Jensen | F03D 13/20 |
| 2021/0277868 | A1 * | 9/2021 | Dalsgaard | F03D 17/00 |
| 2023/0003193 | A1 * | 1/2023 | Neto | F03D 7/0204 |
| 2023/0014873 | A1 * | 1/2023 | Thomsen | F03D 17/00 |
| 2023/0021757 | A1 * | 1/2023 | Steele | F03D 7/0296 |
| 2023/0120533 | A1 * | 4/2023 | Dalsgaard | F03D 7/0212 416/1 |
| 2023/0243334 | A1 * | 8/2023 | Neto | F03D 17/00 416/1 |

FOREIGN PATENT DOCUMENTS

| | | |
|---|---|---|
| KR | 102009596 B1 | 10/2019 |
| WO | 2016050249 A1 | 4/2016 |
| WO | 2016128002 A1 | 8/2016 |
| WO | 2018059259 A1 | 4/2018 |
| WO | 2018157897 A1 | 9/2018 |
| WO | 2019120419 A1 | 6/2019 |
| WO | 2022083835 A1 | 4/2022 |

OTHER PUBLICATIONS

PCT, International Search Report and Written Opinion of The International Searching Authority for Application PCT/DK2021/050308 dated Jan. 21, 2022.

\* cited by examiner (a)

(b)

(a)

(b)

MULTI-ROTOR WIND TURBINE YAW CONTROL

TECHNICAL FIELD

The present disclosure relates to a method for controlling a multi-rotor wind turbine generator.

BACKGROUND

There is a general trend in the wind power industry towards the use of increasingly large wind turbines with larger rotors in order to maximise the power output from each wind turbine and thereby reduce the cost of power production.

One approach for providing a large, cost-efficient wind turbine is the multirotor wind turbine (MR wind turbine), an example of which is schematically illustrated in FIG. 1. MR wind turbines 1 include multiple rotor nacelle assemblies (RNAs) 3, each of which comprises a rotor 4 and a generator housed within a nacelle 5 that is configured to generate power. The RNAs 3 are each mounted to a common tower 2 by a support arrangement 6 including one or more RNA supporting elements such as arms 8 that extend outwardly from the tower 2 in opposing directions. FIG. 1 illustrates a turbine with 4 RNAs arranged in a single layer, but other arrangements of two or more RNAs are also possible.

The support arrangement 6 may be mounted to the tower by a central yawing system 9 that is configured to change the yaw angle of the support arrangement 6 relative to the tower 2 to thereby align the RNAs 3 mounted thereto with the prevailing wind direction. The central yawing system 9 may be an active system that is configured to move the support arrangement 6 relative to the tower 2, or a passive system that is configured to use wind forces to control the angle of the support arrangement 6, as described in US2018023543 and US2019048847.

In conventional multi-rotor systems, a wind sensor (not shown), configured to sense direction and speed, is mounted on each RNA 3. The wind sensor is configured to indicate the direction of incident wind relative to the central axis of the rotor 4 of the RNA 3. Various algorithms and wind adjustment factors have been implemented to ensure that the relative angle of the wind measured by the sensor is correct and that any effects have been accounted for. However, even with these algorithms and adjustment factors, measurements by the wind sensor may not be accurate. For example, even the best algorithms may find it difficult to account for the large variations in environment caused by changes in weather, air pressure, wakes from other turbines, changes in the air flow through the rotor of the RNA at different directions, and misalignment of the sensors relative to the yaw system. A particular challenge in MR turbines is that the support arrangement may bend so that the RNAs do not align correctly with the wind and the yaw system.

It is against this background that the invention has been devised.

SUMMARY OF THE INVENTION

According to an aspect of the present invention there is provided a method for controlling a multi-rotor wind turbine generator having at least two rotor nacelle assemblies mounted to a support arrangement by a common yaw control system and each having a wind direction sensor mounted thereto configured to measure a wind direction relative to forward direction of its rotor nacelle assembly. The method comprises: measuring, for each rotor nacelle assembly, wind power parameter data for the rotor nacelle assembly over a plurality of wind directions measured by the wind direction sensor; determining, for each rotor nacelle assembly, the wind direction at which the wind power parameter has a maximum value; determining a control wind direction as the average wind direction of the determined wind directions at which the wind power parameter has its maximum value; and controlling the common yaw control system based on the determined control wind direction.

The above method advantageously ensures that the rotor nacelle assemblies are controlled to minimise power losses where suitable. The rotor nacelle assemblies are controlled according to accurate data and measurements of a wind power parameter to ensure that the power losses are minimised and power output optimised.

The average wind direction may comprise a mean wind direction from the determined wind directions.

The average wind direction may comprise a weighted mean wind direction based on the determined wind directions. Determining the control wind direction may comprise: applying a weighting to the determined wind directions based on the relative values of the wind power parameter at those wind directions; and determining the mean wind direction from the weighted determined wind directions.

According to another aspect of the invention, there is provided a method for controlling a multi-rotor wind turbine generator having at least two rotor nacelle assemblies mounted to a support arrangement by a common yaw control system and each having a wind direction sensor mounted thereto configured to measure a wind direction relative to forward direction of its rotor nacelle assembly. The method comprises: measuring, for each rotor nacelle assembly, wind power parameter data for the rotor nacelle assembly over a plurality of wind directions measured by the wind direction sensor; combining the wind power parameter data from each rotor nacelle assembly to provide an overall wind power parameter data set for the rotor nacelle assemblies over a plurality of common wind directions; determining, from the overall measurement set, a control wind direction as the wind direction at which the wind power parameter has a maximum value; and controlling the common yaw control system based on the determined control wind direction.

This method is beneficial as it allows the power output of the rotor nacelle assemblies to be maximised. It also enables the power output of the entire turbine to be taken into account and for the yaw system to be controlled based on the entire turbine. In this way, power losses are minimised.

Combining the wind power parameter data may comprise, for each measured wind power parameter value and relative wind direction from the rotor nacelle assemblies, summing the wind power parameter values and determining an average of the relative wind directions.

The multi-rotor wind turbine generator may comprise one or more rotor nacelle assemblies unconnected to the common yaw control system. Combining the wind power parameter data may comprise combining the data received for the plurality of rotor nacelle assemblies, including the unconnected rotor nacelle assembly.

Any of the methods above may comprise recalibrating each wind direction sensor to set the wind direction at which the wind direction sensor measures zero degrees as equal to the control wind direction. Alternatively, any of the methods above may comprise recalibrating each wind direction sensor to set the wind direction at which the wind direction sensor measures zero degrees as between the control wind direction and the current wind direction at which the sensor measures zero degrees.

Upon identification of a fault in one of the wind direction sensors after the recalibration, the common yaw control system may be controlled based on data from another of the wind direction sensors.

Any of the methods described above may comprise separating the received wind power parameter data into relative wind direction bins according to the associated wind direction. Each bin may comprise a range of relative wind directions. The methods may further comprise determining an average wind power parameter value for each bin, and selecting the bin with the highest average wind power parameter value for use in determining the control wind direction.

Any of the above methods may comprise separating the received wind power parameter data into wind power parameter ranges, in which each bin comprises a range of wind power parameter values relative to a nominal wind power parameter value. The methods may further comprise determining a control wind direction for each wind power parameter range, determining the wind power parameter range in which the turbine is operating, and controlling the common yaw system according to the control wind direction for that wind power parameter range.

The above methods may comprise selecting one of the preliminary relative wind directions as the determined wind direction based on a moving average value of the wind power parameter.

The wind power parameter data in the above methods may comprise power output of a generator of the rotor nacelle assembly or pitch load of one or more blades of a rotor nacelle assembly.

Controlling the common yaw control system in any of the above methods may comprise: controlling the common yaw control system based on an error value between a measured relative wind direction and either the control wind direction or a zero degree wind direction based on the control wind direction.

Controlling the common yaw control system based on the error value may comprise: comparing the error value with a predetermined threshold error value; and operating the system to yaw the rotor nacelle assemblies if the error value is greater than the predetermined threshold error value.

According to another aspect of the invention, there is provided a wind turbine yaw control system. The system comprises a yaw motor configured to yaw at least two rotor nacelle assemblies, and a controller configured to perform one of the above methods.

According to another aspect of the invention, there is provided a method for controlling a multi-rotor wind turbine generator having at least two rotor nacelle assemblies mounted to a support arrangement by a common yaw control system and each having a wind direction sensor mounted thereto configured to measure a wind direction relative to forward direction of its rotor nacelle assembly. The method comprises: for each rotor nacelle assembly, receiving measurement sets comprising data indicating a wind power parameter of the rotor nacelle assembly and the corresponding relative wind direction over a plurality of relative wind directions; determining a relative wind direction corresponding to an optimised combined wind power parameter, based on the received measurement sets; and controlling the common yaw control system according to the relative wind direction.

The term optimised as used herein relates to a substantially maximised wind power parameter or to a substantially minimised losses of the wind power parameter. The optimisation may not correspond to a true maximum but may be an approximation thereto.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Generally the methods described herein are directed to the control of a common yaw system for rotor nacelle assemblies to improve power output to or close to a maximum possible value. The methods operate to measure the relationship between a wind power parameter and a plurality of relative wind directions for each of a plurality of rotor nacelle assemblies and to generate a value for an optimum relative wind direction according to which the yaw system is controlled.

The term "control wind direction" as used herein relates a wind direction at which a wind power parameter has its maximum. The control wind direction may be used to recalibrate one or more wind direction sensors so that the control wind direction and the measured relative wind direction are aligned.

The term "measured relative wind direction" as used herein relates to a wind direction measured by a wind direction sensor on a rotor nacelle assembly relative. In calibrated sensors, the measurement is made relative to the central or rotational axis of the rotor, with a wind direction of zero degrees being when the wind is aligned with the central axis and incident on the rotor from the front. The measured relative wind direction is typically an averaged wind direction over a period of time. The measured relative wind direction may be calibrated so that zero degrees is measured when the measured relative wind direction and control wind direction are aligned.

Figure 1:
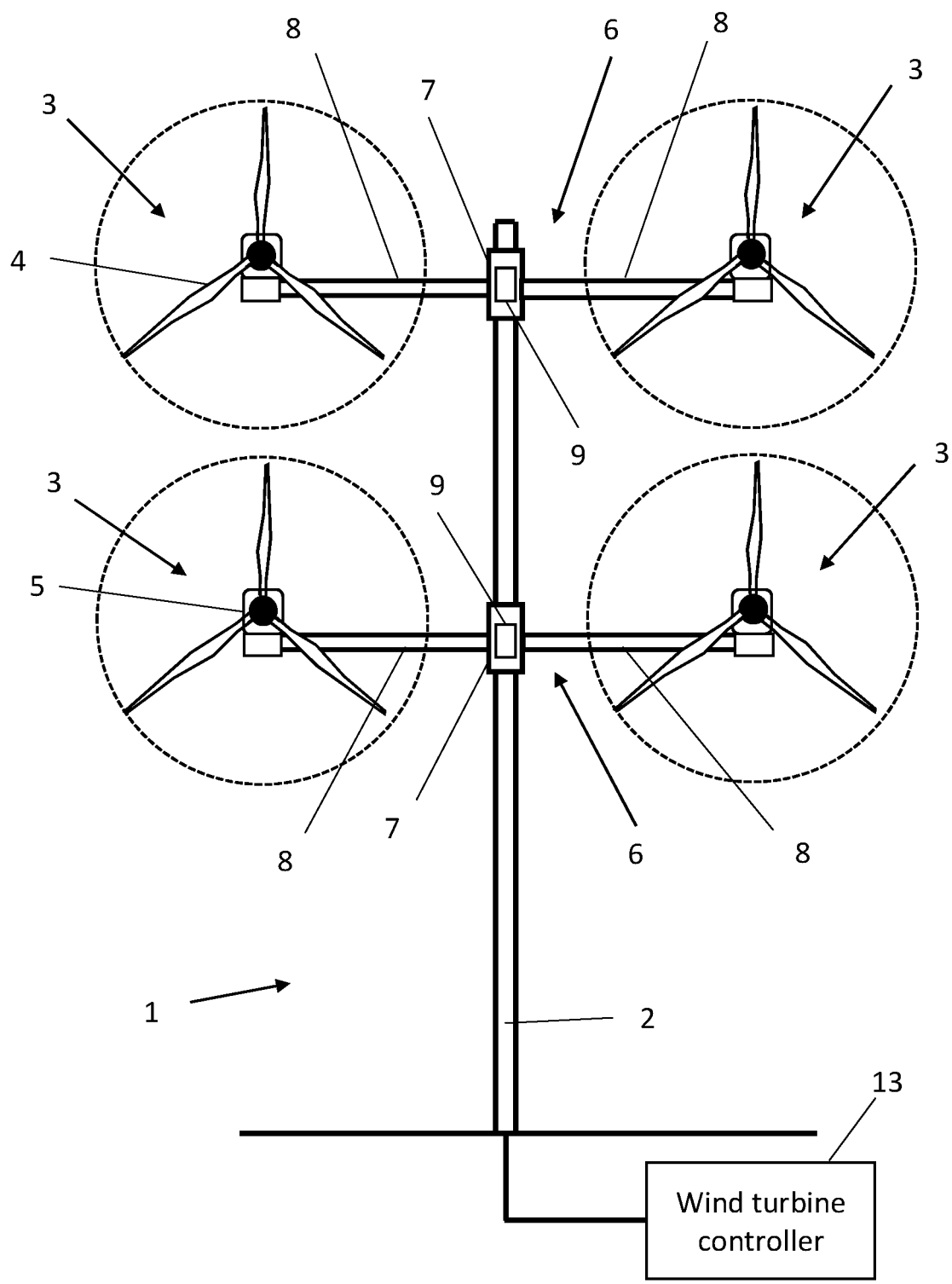
FIG. 1 schematically illustrate a front view of a multi-rotor wind turbine to which the present invention may be applied in accordance with one possible embodiment.
Figure 2A:
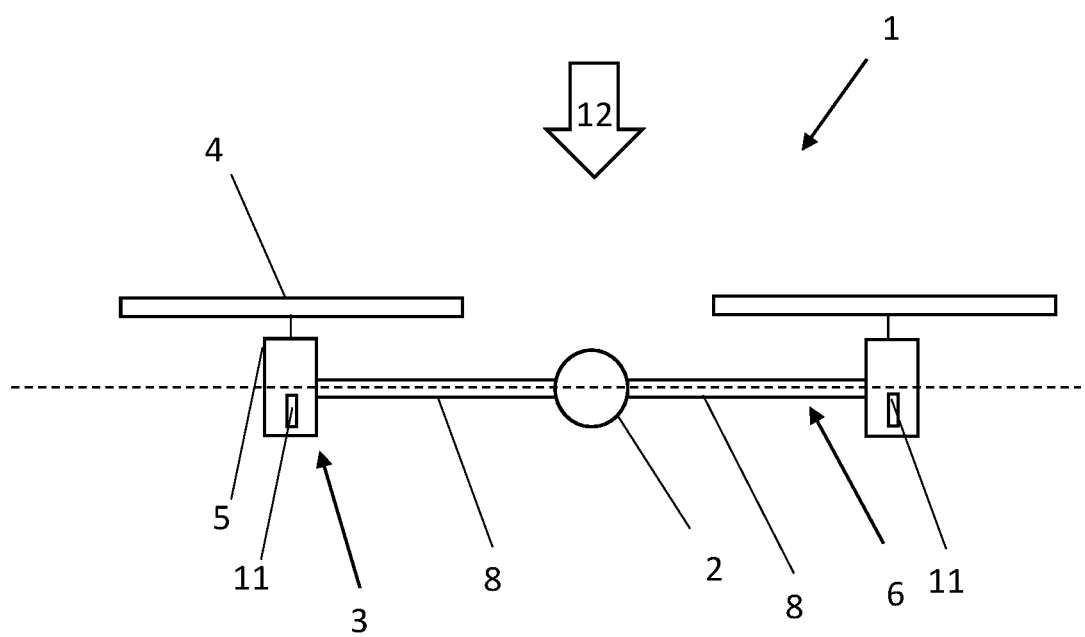
FIGS. 2a and 2b schematically illustrate plan views of a pair of rotor nacelle assemblies of the multi-rotor wind turbine shown in FIG. 1.
Figure 2B:
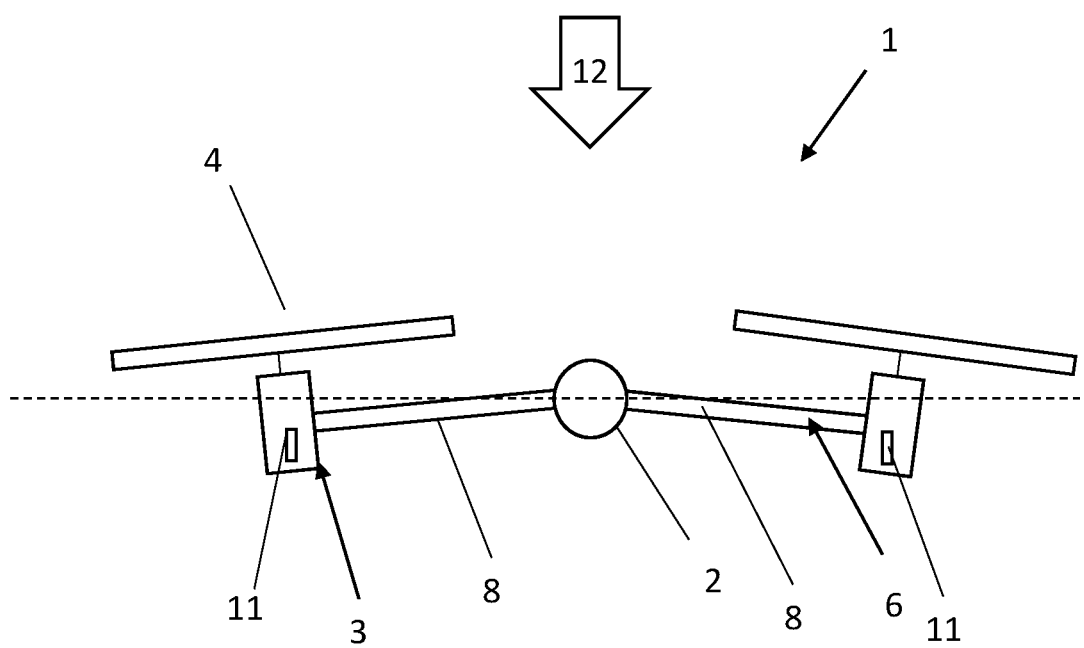

FIGS. 1, 2a, and 2b schematically illustrate an example of a multirotor wind turbine that is suitable for use with embodiments of the present invention. However, it will be appreciated that the present invention may also be applied to many other types of multirotor wind turbine having different configurations to the configuration illustrated in FIGS. 1 to 2b and described below.

The multirotor wind turbine 1 illustrated in FIG. 1 comprises a tower 2 that extends upwardly in a generally vertical direction from a base. The wind turbine 1 may be either an onshore wind turbine or an offshore wind turbine, so the base of the tower 2 may be connected either to the ground or to an offshore platform.

The wind turbine 1 comprises an array of rotor nacelle assemblies (RNAs) 3 including four individual RNAs. Each RNA 3 comprises a windward facing HAWT-type rotor 4 that is rotatably mounted to a housing or nacelle 5 and configured to drive a generator located within the nacelle in a conventional manner, as described in more detail below.

The RNAs 3 are mounted to the tower 2 of the wind turbine 1 by a support arrangement including a pair of common support structures 6. A first one of the support structures 6 is mounted to the tower 2 adjacent to its upper end, and a second one of the support structures 6 is mounted to the tower 2 at an intermediate location along its height. Each of the support structures 6 comprises a mounting portion 7 via which the support structure 6 is mounted to the tower 2, and a pair of support elements or arms 8 that extend outwardly from the mounting portion 7 in opposing directions. Each of the arms 8 supports a respective one of the RNAs 3 at or adjacent to its distal end to thereby mount the RNAs 3 to the tower 2 of the wind turbine 1.

In FIG. 1, each of the arms 8 is illustrated to extend outwardly from the tower 2 in a generally horizontal direction. In addition, the arms 8 of each support structure 6 are illustrated to extend in a common vertical plane, as shown in FIG. 2a. However, it will be appreciated that many other configurations are also possible, as described in more detail below. For example, in other embodiments the arms 8 may be angled upwardly and/or in a forward (windward) direction.

The mounting portions 7 of the support structures 6 are each mounted to the tower 2 by respective central yawing systems 9 that are configured to enable the yaw angles of the support structures 6 to be changed with respect to the tower 2. The central yawing systems 9 provide the primary mechanism by which the RNAs 3 are aligned with the prevailing wind direction. In some embodiments the yawing systems 9 may additionally comprise locking systems that are configured to physically lock the yawing systems 9 in order to prevent unwanted changes. The operation of the turbine, and particularly the yaw systems 9, are controlled by a wind turbine controller 13.

While the central yaw systems 9 permit re-orientation of the RNA pairs relative to the wind, the measurement of the direction the wind is coming from is performed by wind sensors 11 (shown in FIGS. 2a and 2b) mounted on the top of each RNA 3. The wind sensors 11 are mounted to the roof of the nacelle 5 of their respective RNA 3 behind the rotor 4. Thus, when an RNA 3 is pointing directly into the wind, as shown in FIG. 2a where the wind direction is indicated by the arrow 12, the rotor 4 and wind sensor 11 are effectively aligned with the direction of the wind. Wind sensors 11 typically comprise a moveable vane rotatable on an axis to align with the wind direction or an ultrasonic sensor. The sensor measures the angle of the wind relative to the main axis of the rotor 4, or an alternative point of reference, to establish a measured relative wind direction.

Establishing a relative wind direction is dependent on the correct alignment of the rotor 4 and wind sensor 11, the correct calibration of the wind sensor 11, and the rotor 4 being mounted so that its position according to the yaw system 9 is accurate. However, in practice, these factors vary. For example, in some situations the rotor 4 and wind sensor 11 may be misaligned so that the wind sensor 11 gives a non-zero reading when the rotor is aligned with the wind. In other examples, the wind sensor 11 may be incorrectly calibrated, again giving an incorrect reading at one or more points of the relative wind scale. Finally, the RNAs 3 may be subject to wind speeds that cause the support system to yield slightly, so that the RNAs 3 are bent backwards, causing each rotor on either side of the common yaw system to be pointing out of the wind to a small degree.

This final example, where the support arms 8 bend backwards relative to a horizontal axis, is shown in FIG. 2b. FIG. 2b illustrates the plan view shown in FIG. 2a, but with the RNAs 3 bent backwards out of the wind slightly (when compared with the situation in FIG. 2a where no bending occurs). In this situation, the wind direction 12 is depicted as 0 degrees relative to the yaw system, and the sensors 11 align with this wind direction 12. However, as the RNAs 3 are pointing to either side slightly, the reading from the sensors 11 will be a few degrees out of the wind on each side.

A further aspect to be taken into account in the measurement of relative wind directions is the impact of the rotor 4 and its rotation on the measurements made by the wind sensors 11 and by other RNAs 3 on the measurements made by a wind sensor 11.

Aerodynamic effects may cause changes in wind direction that cause the sensor 11 to give an incorrect or different reading to the true relative wind direction.

Thus, a difference may be identified and taken into account between the true relative wind direction and the measured relative wind direction. Inaccurate readings by wind direction sensors on any type of wind turbine result in the power output of the turbine being reduced relative to its potential maximum. It is generally accepted that aligning the rotor with the wind, so that the true relative wind direction is zero degrees, results in the greatest power output of the turbine. However, if it is not possible to measure when the rotor and wind are aligned, the power output of the turbine is reduced and not at its optimum.

In conventional single-rotor wind turbines, attempts have been made to quantify the aerodynamic effects on measured relative wind direction so that sensors can be calibrated to account for these effects. While these have been successful to varying degrees, these methods do not account for the misalignment or miscalibration of the sensors. When applied to multi-rotor turbines, the issues surrounding other effects such as the bending of the support structure also cannot be taken into account easily by present methods.

Therefore, the methods described below have been developed by the inventors to ensure that the common yaw systems 9 and RNAs 3 are controlled so that they are oriented at an optimum position relative to the wind to ensure that power output is as high as possible. The below methods make use of available, accurate data to ensure that a maximum power output is achieved.

Figure 3:
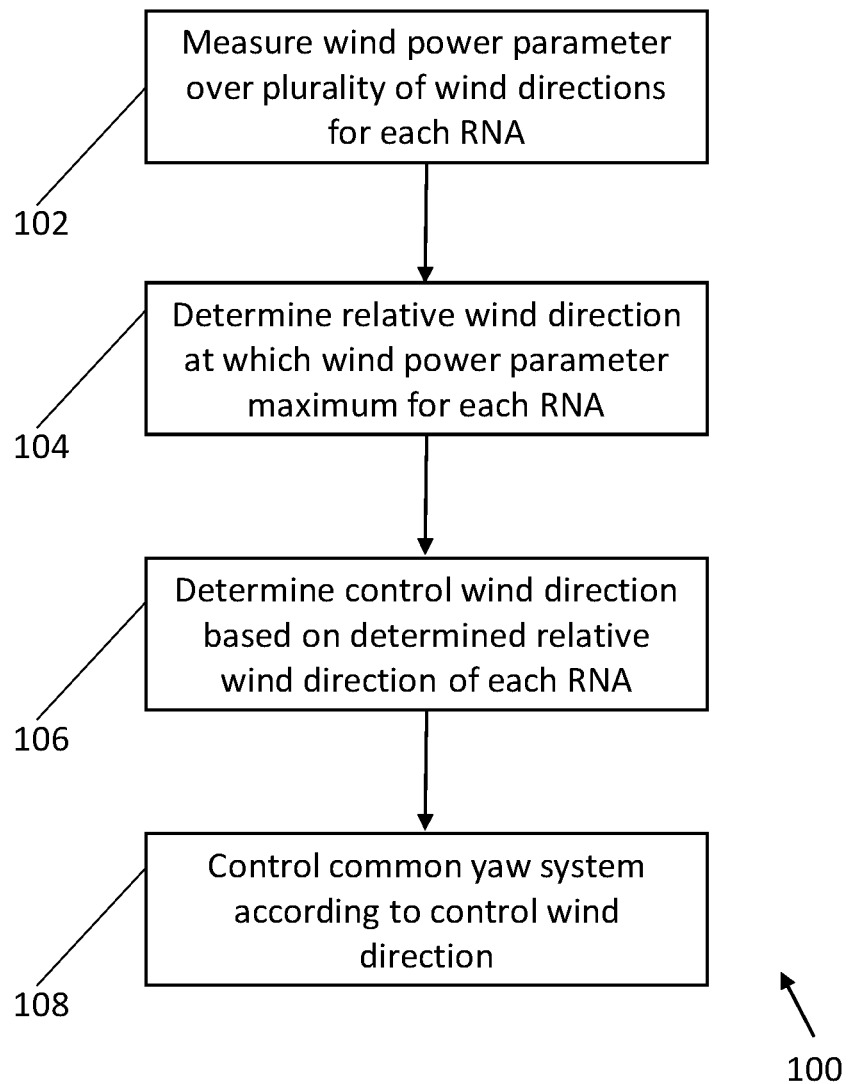
FIG. 3 shows a method for controlling a multi-rotor wind turbine generator according to an embodiment of the invention.

A first method 100 is shown in FIG. 3, and explained with reference to the accompanying charts in FIGS. 4 and 5. A second method 200, which may be used independently of the first method 100 or in conjunction with the first method 100, is depicted in FIG. 6 and explained with reference to the accompanying chart in FIG. 7.

Figure 8:
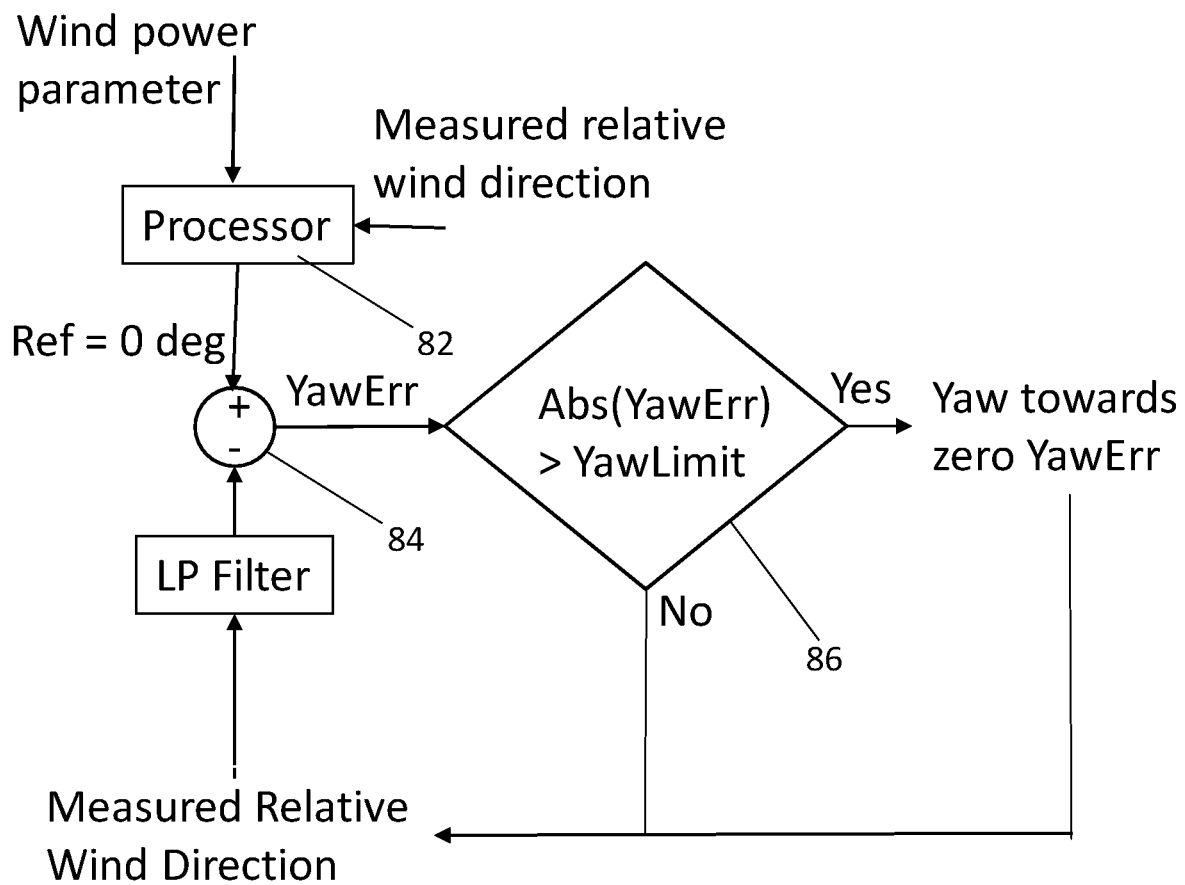
FIG. 8 shows a control diagram for controlling the wind turbine of FIG. 1.

The following methods are performed by the wind turbine controller 13 that is connected to and receives inputs from the wind sensors 11 of the turbine and from power output sensors for each RNA 3. The wind turbine controller 13 implements the methods and outputs control signals indicating adjustments to be made to the angle of the common yaw system 9 and any other yaw system or relevant control system present in the turbine as required. An example schematic of a controller is shown in FIG. 8, and its operation will be described in due course. Such a wind turbine controller may be located local to the wind turbine or remote from it. As will be familiar to the skilled person, the control of a common yaw system 9 to yaw the angle of the RNAs 3 is implemented by operating a yaw motor (not shown).

Figure 4:
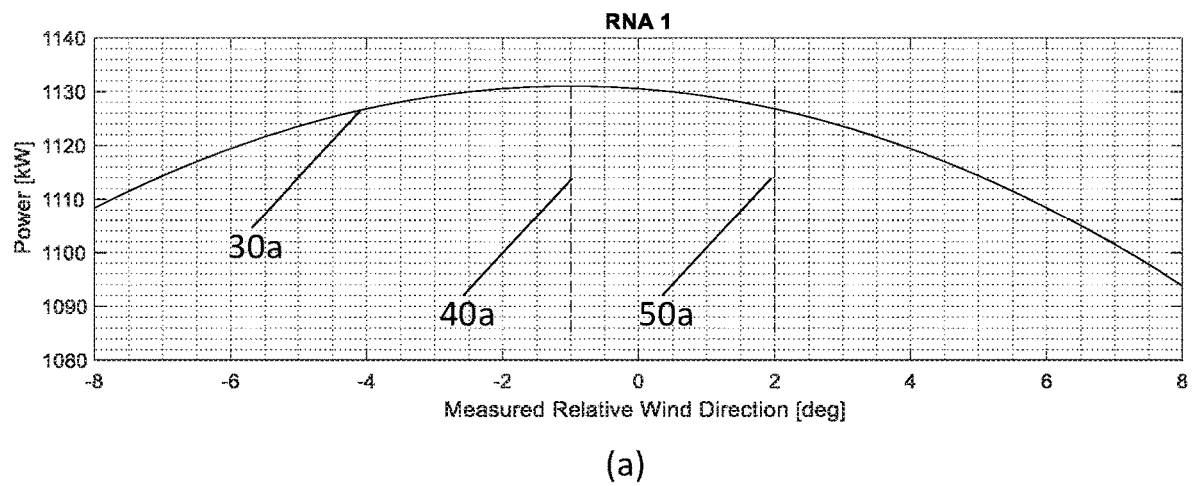
FIG. 4 illustrates a pair of charts depicting power to relative wind direction relationships for a pair of rotor nacelle assemblies.
Figure 4:
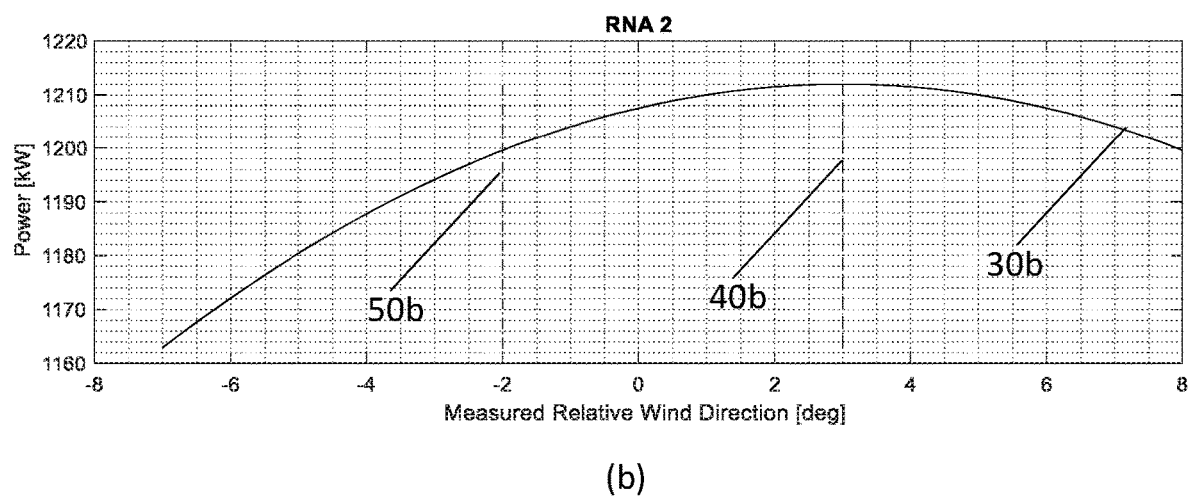

Beginning first with the FIGS. 3 and 4, the method 100 has a first step 102 of measuring a wind power parameter data for each RNA over a plurality of relative wind directions measured by the wind direction sensor. At step 104, the data gathered in step 102 is used to determine the relative wind direction at which the wind power parameter has a maximum value for each RNA.

The wind power parameter typically comprises the measured active power output value, e.g. as may be determined by an appropriate power meter installed at the wind turbine, as would be understood by the skilled person. In some embodiments, where the wind turbine is operating close to its operational limits, the pitch angle may be used as the wind power parameter. In this step, the wind power parameter data is gathered by measuring both the wind power parameter and the associated wind direction as measured by the wind direction sensor over a predetermined period of time. As the wind direction measured by the sensor changes throughout a period, the data will permit power data to be generated over a plurality of different wind directions. The power distribution relative to wind direction can be determined for each RNA.

The power distributions may be generated based on data gathered over a predetermined period of time. During step 102, the relative wind direction and wind power parameter are sampled over a period of time. The relative wind directions may be binned into bins having a set width. For instance, each bin between two direction limits may be 1 degree wide, 0.1 degree wide, 0.01 degree wide, or any suitable width depending upon the precision of the sensors used. The limits may, for example, be −8 to 8 degrees, or a greater or smaller range may be used. When a sample is found to have a relative wind direction in a bin, the measured wind power parameter in the sample is used to calculate a new average wind power parameter for the bin. This may be calculated using a cumulative moving average.

Where bins are used, step 104 may comprise selecting the bin corresponding to the highest value. Alternatively or additionally, step 104 may comprise fitting the wind power parameter values for the bins to a curve, and calculating the maximum point on the curve. In some examples, the bin with the highest value may be determined and a curve fitted using either the neighbouring bin values or the raw data used to generate the bin value.

In step 102, in order to ensure an accurate distribution of data, the distributions may be generated according to one or more thresholds indicating when a sufficient amount of data has been gathered. Each wind direction may have an associated threshold. When all thresholds are met for a range of wind directions, the data may be used in the remainder of the method.

In addition, in order to ensure that variations in wind speed do not affect the quality of the data, the wind power parameter data may also be collected in predetermined ranges or 'bins' corresponding to percentage ranges of the rated power of the turbine. Wind power parameter data is utilised to arrange the data into the bins to ensure that the data is accurate; utilising wind speed for binning is possible but may result in inaccuracies in the data due to aerodynamic effects associated with the RNAs and the positioning of the wind speed sensors relative to the rotors. Binning by wind power parameter level is also useful to allow effects seen at different wind speeds to be observed. For example, the air flow through a rotor or the amount of bending of the support structure may be different depending on how fast the wind is and consequently how much power is generated by each RNA. Therefore, it is useful to bin the wind power parameter data to adapt to changing conditions. The method below may be applied to determine a control wind direction for each range or bin of the wind power parameters, and a determination made as to which control wind direction is most appropriate for controlling the turbine according to a measured wind power output.

An example of a power distribution as determined in step 102 for each RNA of a pair of RNAs controlled by the same common yaw system is shown in the two charts, (a) and (b), of FIG. 4. In these charts, the wind power parameter is power output.

In each of the charts of FIG. 4, the power distribution line is illustrated by the solid line, labelled 30a in chart (a) and 30b in chart (b). The dashed vertical line, labelled 40a and in charts (a) and (b) respectively, indicates the relative wind direction at which the maximum value of the wind power parameter occurs for the distribution, as determined in step 104. The dash-dot vertical line, labelled 50a and 50b in charts (a) and (b) respectively, indicates an example measurement from the wind direction sensor 11 of the RNA 3 of the relative wind direction measured over the same or a similar time period as the power distribution was determined, without any correction according to the present method applied.

In these charts, it can be seen that the RNA represented by the chart (a), RNA 1, has a maximum power parameter value of approximately 1130 kW when the relative wind direction is −1 degrees as measured by the wind direction sensor. However, the uncorrected measurements of the wind direction sensor 11 indicate that RNA 1 is positioned at +2 degrees to the relative wind direction. In other words, data collected by the wind direction sensor suggests that the angle of the wind relative to the main direction of the rotor of RNA 1 is +2 degrees, when in fact the point at which maximum power is achieved is −1 degrees. As the maximum power point is taken to indicate the position at which the wind and the rotor are aligned, i.e. the wind is head-on. Thus, there may be inaccuracies or errors in the measurement of the relative wind direction due to one or more of the issues described above that cause there to be a difference between these two values. As power output is the main goal of a wind turbine, it is preferable to control according to the point of maximum output.

Similarly, it can be seen in the chart (b) for RNA 2 that the maximum wind power parameter is found at +3 degrees, with a value of 1210 kW, while the sensor suggests that the relative angle of the RNA 2 to the wind is −2 degrees.

The above difference in readings by the wind sensors of +2 and −2 degrees may indicate, for example, that the support structure holding each RNA is bending backwards, as shown in FIG. 2b.

At a next step 106 in the method 100, a control wind direction is determined based on the data found in step 104. In this embodiment, the control wind direction is the average wind direction of the determined wind directions at which the wind power parameter has its maximum value. In other words, the mean of the two maximum values, the lines 40a and 40b in the charts of FIG. 4, is calculated and a mean value determined. This mean value corresponds to the position at which the wind power parameter is substantially optimised. Where the power parameter values are substantially similar, the mean direction corresponds to the point of maximum power parameter for the pair of RNAs. Accordingly, this method works well when both RNAs are performing equally well.

In some examples, such as where there are differences between the values of the maximum wind power parameter, weightings may be applied to the relative wind directions before averaging in order to achieve a more optimum control wind direction.

In FIG. 4, applying step 106 leads to a control relative wind direction of +1 degrees, as the mean of −1 and +3 degrees.

As the maximum value of the wind power parameter is different for each RNA, it is not possible to achieve the maximum value for one of the RNAs without sacrificing the output of the other. Accordingly, by choosing a mid-point at which the overlap of the power productions is at a maximum or close to a maximum, the power lost due to the positioning of the RNAs is minimised.

Determining the control wind direction may also include setting a value of the zero relative wind direction, i.e. the direction at which the wind sensors measure zero degrees, to be equal to the determined control wind direction. In other words, the wind direction sensors may be recalibrated so that a reading of zero degrees is measured when the measured relative wind direction is the control wind direction. The result of this is that both RNAs have the same zero relative wind direction, so that their point of maximum is equal distance from the zero relative wind direction. Setting this value also has the advantage that measurements from one of the wind sensors can be used to control the yaw system should there be a fault in the other wind sensor.

Figure 5:
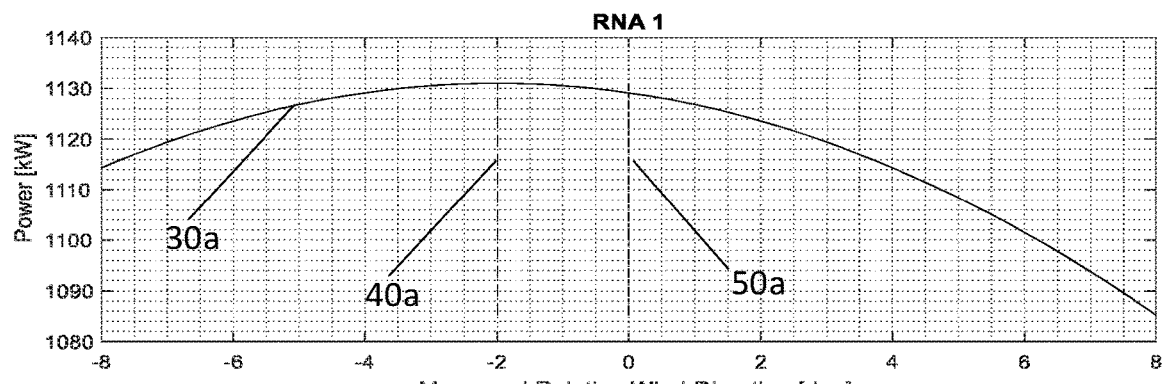
FIG. 5 illustrates the pair of charts in FIG. 4 when adjusted based on the method of FIG. 3.
Figure 5:
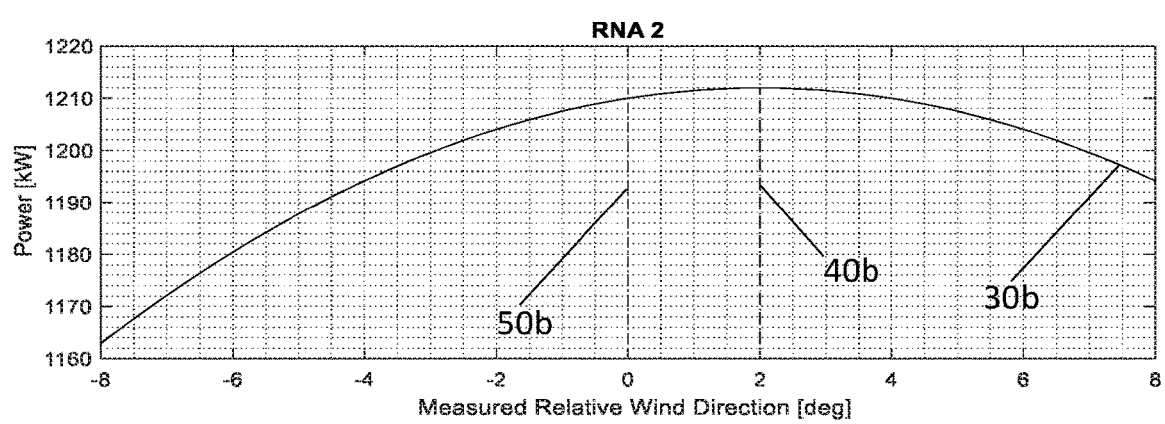
Figure 6:
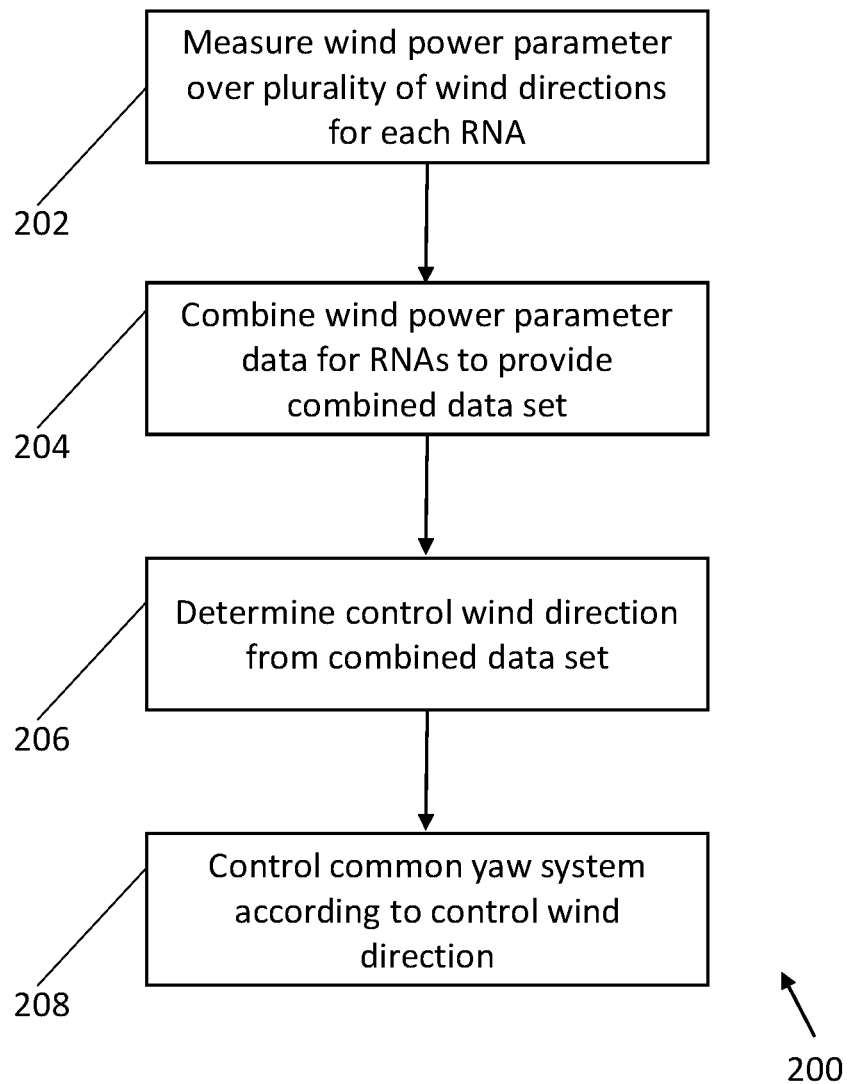
FIG. 6 shows a method for controlling a multi-rotor wind turbine generator according to another embodiment of the invention

An implementation of this step on the example of FIG. 4 is shown in FIG. 5. In FIG. it can be seen that the wind direction sensors 11 of each RNA have been recalibrated so that the zero relative wind direction is the control wind direction as determined above. That is, that from the data gathered according to steps 102 and 104, a control wind direction was determined and the sensors recalibrated accordingly. In the example of FIG. 4, the control direction was determined as +1 degrees, and both sensors were recalibrated to set this as the zero direction. Accordingly, it can now be seen that the point of maximum wind power parameter in each chart is equally distant from the zero relative wind direction.

In other embodiments, determining the control wind direction may alternatively include setting the value of the zero relative wind direction to reduce the difference between the zero wind direction and the determined control wind direction. In other words, the wind direction sensors may be recalibrated so that a reading of zero degrees is measured at a point that is closer to the control wind direction. For example, if it is determined that the control wind direction at which the maximum wind power parameter value is found is at +6 degrees from where the current zero relative wind direction is, then the zero wind direction may be set at +4 degrees. This provides some room for error in sensor readings, and prevents overshoot during control. Advantageously, this also allows for the process to be performed iteratively, so that small incremental changes to the zero wind direction are made rather than larger ones.

At step 108 of the method 100, the common yaw control system is controlled based on the determined control wind direction. Controlling the common yaw system typically includes operating the yaw system to yaw the RNAs so that the angle of the yaw system is at the control wind direction. This includes comparison of the current yaw angle with the control wind direction and determining an error according to which the yawing can be performed. Controlling the yaw control system may also include operating the yaw system to yaw the RNAs when the measured relative wind direction determined by one or more of the wind direction sensors differs from the control relative wind direction. If the sensors are recalibrated so that a zero reading is given when the measured relative wind direction equals the control direction, the control of the yaw system is the normal action of the yaw control system.

In some examples, yawing may be restricted to errors greater than a predetermined threshold. For example, yawing may be only performed if the angle between the current yaw angle and the control wind direction is greater than 5 degrees. This avoids unnecessary power usage for small changes in control wind direction.

After the control wind direction has been set and the turbine is being controlled accordingly, the process may begin again. All data used to create the relevant charts may be erased and the gathering process restarted to ensure that any new effects caused by the yawing can be taken into account.

The above method ensures that the RNAs are yawed into the wind to maximise measurable parameters, thereby improving the efficiency and output of the entire turbine.

Figure 7:
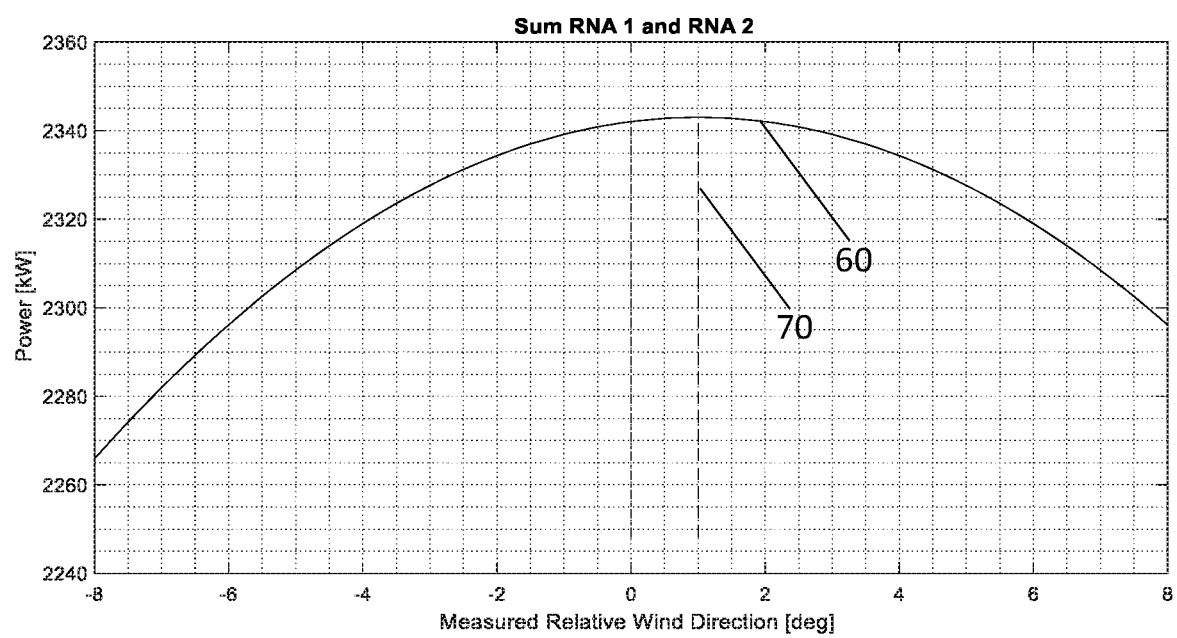
FIG. 7 shows a chart depicting a combined power to relative wind direction relationship for a pair of rotor nacelle assemblies.

An alternative method 200 is provided in FIG. 6 and explained in relation to FIG. 7. The alternative method 200 enables the same output to be determined but in a slightly different way. Thus, the effect of improving the output and efficiency of the multi-rotor turbine is achieved by both methods 100 and 200.

The first step 202 is the same as the first step 102 in the method 100. So, at step 202, wind power parameter data for each RNA is gathered over a plurality of wind directions.

At the next step 204, the wind power parameter data for each RNA is combined to provide a single wind power parameter to relative wind direction data set.

In the present example, the combined data set is for the two RNAs controlled by the common yaw system. However, this method may be applied to any RNAs forming part of the wind turbine. In other words, the entire power output of the turbine may be taken into account in this example and the control determined for the entire turbine. This is useful for ensuring aerodynamic effects of different wind directions are taken into account. Wind direction may cause rotor turbulence, which in turn may change the flow of air over one or more rotors of another RNA in the multi-rotor turbine, and thus affect the power output of that RNA. Therefore, it may be useful to ensure that the yaw angle of the RNAs leads to a maximum across all RNAs and not just those controlled by the common yaw system.

The combined wind power parameter data is achieved by ensuring that the measurements are on a common relative wind direction scale. In a first example, a common relative wind direction scale may be achieved by ensuring that the zero relative wind direction of the wind sensors is the same. This may be achieved by taking an average of the readings of the wind sensors as to what the wind direction is, and then subsequently setting the zero wind direction for the sensors to be equal to this average. In a second example, for each sample taken, the wind power parameter values may be summed and assigned a relative wind direction value that is equal to the average of the relative wind direction readings of the sensors.

Once a common scale for the relative wind direction has been established, the power parameter data sets can be summed to give the overall chart such as the one shown in FIG. 7. The data used to generate FIG. 7 is the same as the data used in FIG. 4, so it can be seen that the total power, represented by the solid line 60, is approximately equal to the power of RNA 1 and RNA 2 in FIG. 4. As in FIG. 4, the point of maximum power can be worked out to be approximately +1 degree.

From the overall data set/chart, at step 206 of the method, a control wind direction can be determined as the point in the overall data or measurement set that the wind power parameter has a maximum value. In FIG. 7, this is the +1 degree point described above and indicated by the dashed line 70. As the overall data set has a combined scale, the yaw system can be controlled according to this value, as is detailed in step 208. Step 208, is the step of controlling the yaw system according to the control wind direction, and this step is the same as step 108.

Although not explicitly described in relation to the second method, the general features of the first method 100 described above, such as the use of bins, the control of the turbine, the determination of sufficient amounts of data, etc, may also be applied in the second method and any methods generally falling within the scope of the independent claims.

FIG. 8 illustrates a schematic of a controller 13 for controlling the yaw control system. As shown in FIG. 8, a processor 82 receives the wind power parameter data and the measured relative wind direction data. The processor 82 determines the reference wind direction, the zero degree value, according to a method as described herein and provides it to a difference junction 84. The difference junction 84 also receives a low-pass filtered, measured relative wind direction. The difference between the zero value and the measured relative wind direction is determined. This value, labelled 'YawErr', is the yaw error. This yaw error is passed through block 86, which determines if the yaw error is greater than a yaw threshold or limit. If the error is not greater than the limit, the controller returns to the passing a new measured relative wind direction through the difference junction 84. If the yaw error is greater than the limit, a control signal is dispatched to a yaw motor to control the motor to yaw the RNAs to reduce the error. The process then resumes. The processor 82 may periodically provide updated reference values as per the methods described herein.

It will be appreciated that various changes and modifications can be made to the present invention without departing from the scope of the present application.

The invention claimed is:

1. A method for controlling a multi-rotor wind turbine generator having at least two rotor nacelle assemblies mounted to a support arrangement by a common yaw control system and each having a wind direction sensor mounted thereto configured to measure a wind direction relative to forward direction of its rotor nacelle assembly, wherein the method comprises:
   receiving, for each rotor nacelle assembly, wind power parameter data that includes a wind power parameter for the rotor nacelle assembly over a plurality of wind directions measured by the wind direction sensor;
   determining, for each rotor nacelle assembly, the wind direction at which the wind power parameter has a maximum value;
   determining a control wind direction as an average wind direction of the determined wind directions at which the wind power parameter has its maximum value, further comprising separating the received wind power parameter data into relative wind direction bins according to the associated wind direction, in which each bin comprises a range of relative wind directions, determining an average wind power parameter value for each bin, and selecting the bin with the highest average wind power parameter value for use in determining the control wind direction; and
   controlling the common yaw control system based on the determined control wind direction.

2. The method of claim 1, wherein the average wind direction comprises a mean wind direction from the determined wind directions.

3. The method of claim 1, wherein the average wind direction comprises a weighted mean wind direction based on the determined wind directions, and wherein determining the control wind direction comprises:
   applying a weighting to the determined wind directions based on the relative values of the wind power parameter at those wind directions; and
   determining the mean wind direction from the weighted determined wind directions.

4. A method for controlling a multi-rotor wind turbine generator having at least two rotor nacelle assemblies mounted to a support arrangement by a common yaw control system and each having a wind direction sensor mounted thereto configured to measure a wind direction relative to forward direction of its rotor nacelle assembly, wherein the method comprises:
   receiving, for each rotor nacelle assembly, wind power parameter data that includes a wind power parameter for the rotor nacelle assembly over a plurality of wind directions measured by the wind direction sensor;
   combining the wind power parameter data from each rotor nacelle assembly to provide an overall wind power parameter data set for the rotor nacelle assemblies over a plurality of common wind directions;
   determining, from the overall measurement wind power parameter data set, a control wind direction as the wind direction at which the wind power parameter has a maximum value, further comprising separating the received wind power parameter data into relative wind direction bins according to the associated wind direction, in which each bin comprises a range of relative wind directions, determining an average wind power parameter value for each bin, and selecting the bin with the highest average wind power parameter value for use in determining the control wind direction; and controlling the common yaw control system based on the determined control wind direction; and recalibrating each wind direction sensor to set the wind direction at which the wind direction sensor measures zero degrees as a value between the control wind direction and a current wind direction at which the wind direction sensor measures zero degrees.

5. The method of claim 4, wherein combining the wind power parameter data comprises, for each measured wind power parameter value and relative wind direction from the rotor nacelle assemblies:

summing the wind power parameter values; and determining an average of the relative wind directions.

6. The method of claim 4, wherein the multi-rotor wind turbine generator comprises one or more rotor nacelle assemblies unconnected to the common yaw control system, and wherein combining the wind power parameter data comprises combining the data received for a plurality of rotor nacelle assemblies, including the unconnected rotor nacelle assembly.

7. The method of claim 1, comprising recalibrating each wind direction sensor to set the wind direction at which the wind direction sensor measures zero degrees as equal to the control wind direction.

8. The method of claim 7, comprising, upon identification of a fault in one of the wind direction sensors after the recalibration, controlling the common yaw control system based on data from another of the wind direction sensors.

9. The method of claim 1, comprising separating the received wind power parameter data into wind power parameter ranges, in which each bin comprises a range of wind power parameter values relative to a nominal wind power parameter value, determining a control wind direction for each wind power parameter range, determining the wind power parameter range in which the multi-robot wind turbine generator is operating, and controlling the common yaw system according to the control wind direction for that wind power parameter range.

10. The method of claim 1, wherein the wind power parameter data comprises power output of a generator of the rotor nacelle assembly or pitch load of one or more blades of a rotor nacelle assembly.

11. The method of claim 1, wherein controlling the common yaw control system comprises controlling the common yaw control system based on an error value between a measured relative wind direction and either the control wind direction or a zero degree wind direction based on the control wind direction.

12. The method of claim 11 wherein controlling the common yaw control system based on the error value comprises:

comparing the error value with a predetermined threshold error value; and operating the system to yaw the rotor nacelle assemblies if the error value is greater than the predetermined threshold error value.

13. A wind turbine yaw control system, comprising:

a yaw motor configured to yaw at least two rotor nacelle assemblies; and a controller configured to perform an operation, comprising:

receiving, for each rotor nacelle assembly, wind power parameter data that includes a wind power parameter for the rotor nacelle assembly over a plurality of wind directions measured by a wind direction sensor;

determining, for each rotor nacelle assembly, the wind direction at which the wind power parameter has a maximum value;

determining a control wind direction as an average wind direction of the determined wind directions at which the wind power parameter has its maximum value, further comprising separating the received wind power parameter data into relative wind direction bins according to the associated wind direction, in which each bin comprises a range of relative wind directions, determining an average wind power parameter value for each bin, and selecting the bin with the highest average wind power parameter value for use in determining the control wind direction; and controlling the wind turbine yaw control system based on the determined control wind direction.

14. The wind turbine yaw control system of claim 13, wherein the average wind direction comprises a mean wind direction from the determined wind directions.

15. The wind turbine yaw control system of claim 13, wherein the average wind direction comprises a weighted mean wind direction based on the determined wind directions, and wherein determining the control wind direction comprises:

applying a weighting to the determined wind directions based on the relative values of the wind power parameter at those wind directions; and determining the mean wind direction from the weighted determined wind directions.

16. The wind turbine yaw control system of claim 13, wherein the operation further comprises separating the received wind power parameter data into wind power parameter ranges, in which each bin comprises a range of wind power parameter values relative to a nominal wind power parameter value, determining a control wind direction for each wind power parameter range, determining the wind power parameter range in which a multi-rotor wind turbine having the wind turbine yaw control system is operating, and controlling the wind turbine yaw control system according to the control wind direction for that wind power parameter range.

17. The method of claim 4, comprising separating the received wind power parameter data into wind power parameter ranges, in which each bin comprises a range of wind power parameter values relative to a nominal wind power parameter value, determining a control wind direction for each wind power parameter range, determining the wind power parameter range in which the multi-rotor wind turbine generator is operating, and controlling the common yaw control system according to the control wind direction for that wind power parameter range.

* * * * *